Sept. 15, 1964 G. H. ROTHBART 3,148,726
PLASTIC CURTAIN CONSTRUCTION
Filed May 17, 1962 2 Sheets-Sheet 1

INVENTOR
Gerard H. Rothbart
BY
Stevens, Davis, Miller & Mosher
ATTORNEYS

Sept. 15, 1964            G. H. ROTHBART            3,148,726
PLASTIC CURTAIN CONSTRUCTION
Filed May 17, 1962                                         2 Sheets—Sheet 2
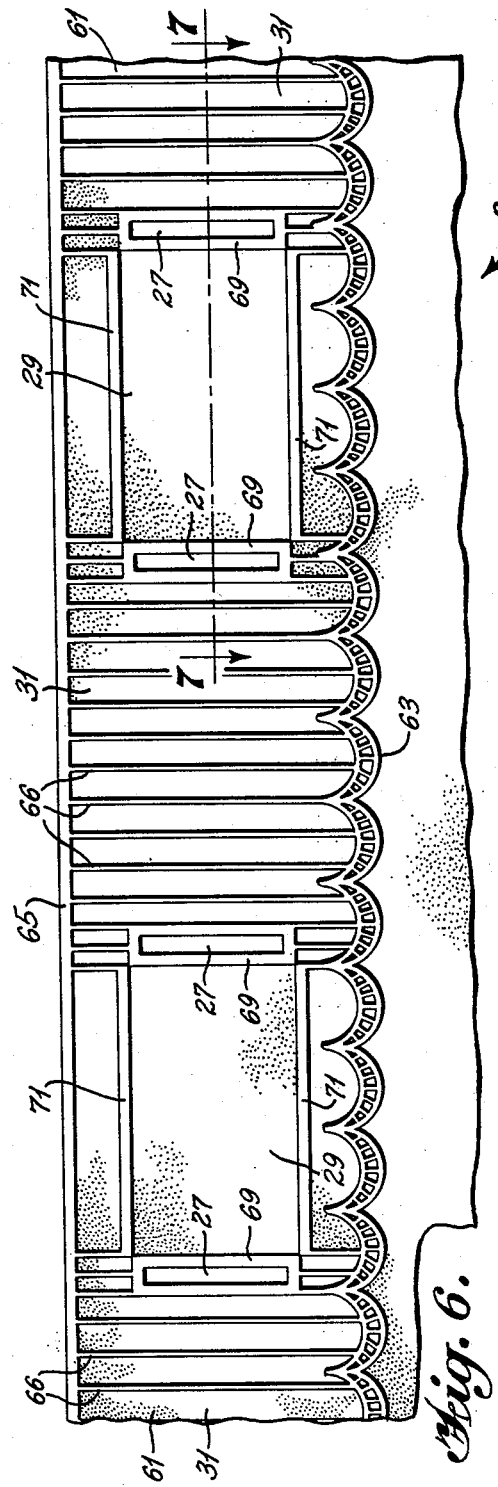
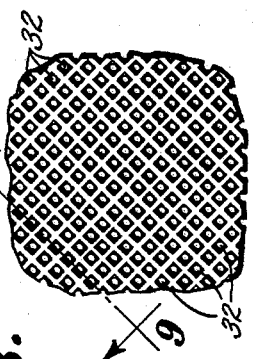
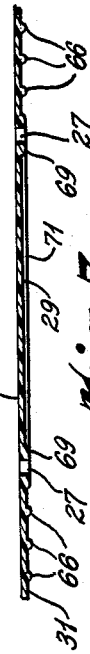
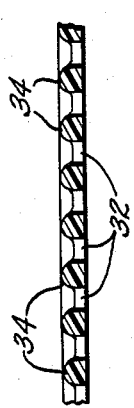
INVENTOR
Gerard H. Rothbart
BY *Stevens, Davis, Miller & Mosher*
ATTORNEYS

United States Patent Office 3,148,726
Patented Sept. 15, 1964

3,148,726
PLASTIC CURTAIN CONSTRUCTION
Gerard Herbert Rothbart, Woodmere, N.Y.
(423 Park Ave. S., New York 16, N.Y.)
Filed May 17, 1962, Ser. No. 195,642
3 Claims. (Cl. 160—390)

This invention relates to decorative hangings and more particularly, a plastic curtain construction which simulates organdy.

Prior to the present invention, plastic curtains were well known. However, the plastic curtains of the prior art to a large extent fail to simulate cloth curtains or have the soft beauty of cloth curtains. Furthermore, prior to the present invention, plastic curtain constructions simulating organdy curtains were unknown. The present invention for the first time combines the beauty, practicality and washability of plastic with the appearance and breathability of the finest Swiss eyelet organdy curtains.

Briefly, according to the present invention, the curtains are formed on molds into sheets. The molded sheets are shaped by the molds to have patterns of solid material on a background which is made up of tiny closely spaced apertures arranged in rows and columns separated by rounded ridges. These apertures provide the plastic material with its appearance of organdy. The sheets of plastic material are folded and hung from curtain rods to provide the curtain construction. Vertically disposed elongated curtains are spaced across the top side of each sheet of plastic material. A curtain rod hanging the curtains extends through these holes, which are provided with raised borders of solid plastic material to provide mechanical strength. Reinforcing ribs are molded into the plastic sheet between these apertures to provide reinforcing to the sheet of plastic in the areas where the sheet is folded.

Accordingly, the principal object of the present invention is to provide an improved plastic curtain construction.

A further object of the present invention is to provide a plastic curtain construction which simulates organdy.

Further objects and advantages of the present invention will become readily apparent as the following detailed description of the invention unfolds and when taken in conjunction with the drawings wherein:

FIGURE 5 is a sectional view taken along the line 5—5 in FIGURE 4;

FIGURE 6 is a fragmentary view of a plastic sheet forming the lower part of the curtain construction illustrating the structural details of the plastic sheet around the holes for receiving the curtain rod;

FIGURE 7 is a sectional view taken along the line 7—7 in FIGURE 6;

FIGURE 8 is an enlarged fragmentary view of the front face of a plastic sheet of the curtain construction illustrating the structural details of the tiny, closely spaced apertures, which provide the appearance of organdy; and FIGURE 9 is a sectional view taken along the line 9—9 in FIGURE 8.

Figure 1:
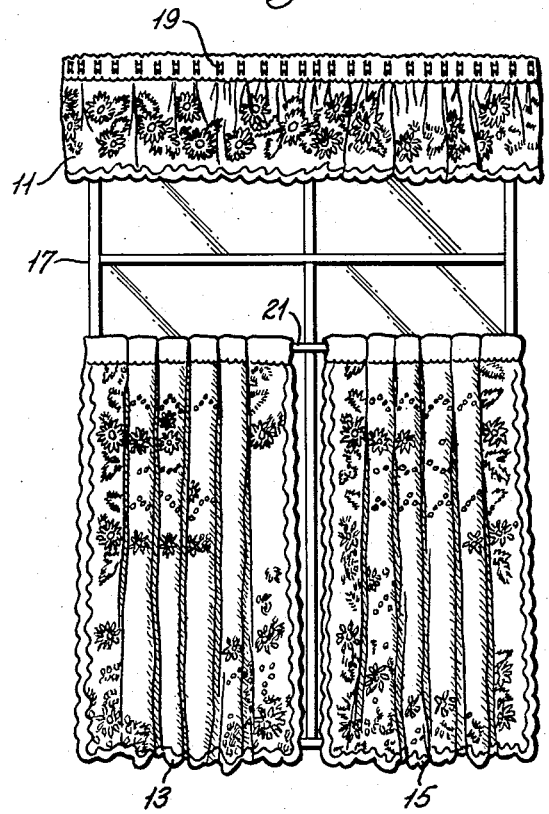
FIGURE 1 illustrates the curtain construction of the present invention hanging at a window.

As shown in FIGURE 1, the curtain construction of the present invention comprises a thin flexible sheet of plastic 11 which forms the valance of the curtain construction and two thin sheets of flexible plastic 13 and 15 which form the lower portion of the curtain construction.

Figure 2:
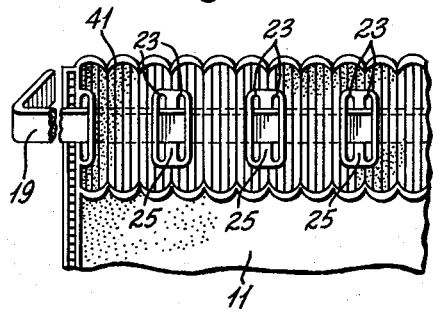
FIGURE 2 is a fragmentary view of that part of the curtain construction providing the valance illustrating how the valance hangs on the curtain rod.

The sheet 11 is supported by a curtain rod 19 extending across the top of the window 17 at which the curtain construction is hung. The sheets 13 and 15 are supported by a curtain rod 21 extending across the middle of the window 17. As shown in FIGURE 2, the curtain rod 19 extends through vertically disposed elongated holes 23 spaced across the top of the plastic sheet 11 which forms the valance. The holes 23 are arranged in pairs with the holes of each pair being arranged close together with relatively large spaces between each pair of holes. The rod 19 passes through each of the holes 23 passing in back of the sheet 11 between each pair of holes 23 and passing in front of the narrow strip 25 of plastic material separating the holes 23 of each pair. The sheet of plastic 11 forming the valance is gathered on the rod 19 as shown in FIGURE 1 so that the sheet 11 falls from the rod in folds and is formed in folds around the rod 19.

Figure 3:
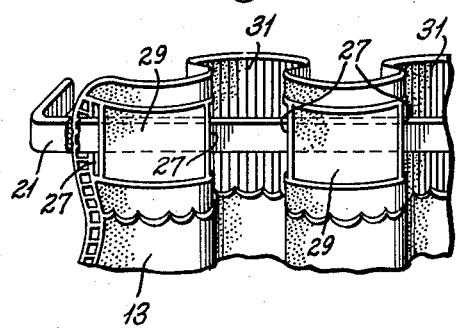
FIGURE 3 is a fragmentary view of the lower part of the curtain construction illustrating how it hangs on the curtain rod.

As shown in FIGURE 3, the sheet of material 13 forming one-half of the lower portion of curtain construction is provided with elongated vertically disposed holes 27 extending across the top of the plastic sheet 13. The holes 27 are arranged in pairs and the rod 29 extends through each of the holes 27 passing in back of that portion 29 between the holes 27 of each pair and in front of that portion 31 separating each pair of holes. The sheet of material 13 is folded in the portion 31 and these portions extend out behind the rod 21. The portions 29 are positioned closely adjacent to one another on the rod 21 as shown in FIGURE 1 so that a flat facade is presented in front of the rod 21 with the sheet 13 hanging down in folds. The sheet 15 is identical to the sheet 13 and is hung from the rod 21 in exactly the same manner.

The enlarged view of the material in FIGURE 8 and the additional view in FIGURE 9 illustrate the structure of the reticulate background of the plastic sheets in detail. As shown in FIGURE 8, the sheet has a large number of closely spaced tiny apertures 32 defined therethrough. These apertures are less than 1 millimeter in diameter and in the preferred embodiment are approximately ½ a millimeter in diameter. The apertures are separated from each other by a distance approximately equal to the diameter of the holes. The holes, as shown in FIGURE 8, are arranged in regular rows and columns and the plastic material running between the rows and between the columns on the front face of the material are shaped as rounded ridges 34 so that the plastic sheet gives the appearance of organdy cloth material. This effect is achieved in part because the rounded ridges, between the closely spaced apertures have the same appearance as the loosely woven threads of organdy cloth. The back face of the sheet as shown in FIGURE 9 is flat.

Figure 4:
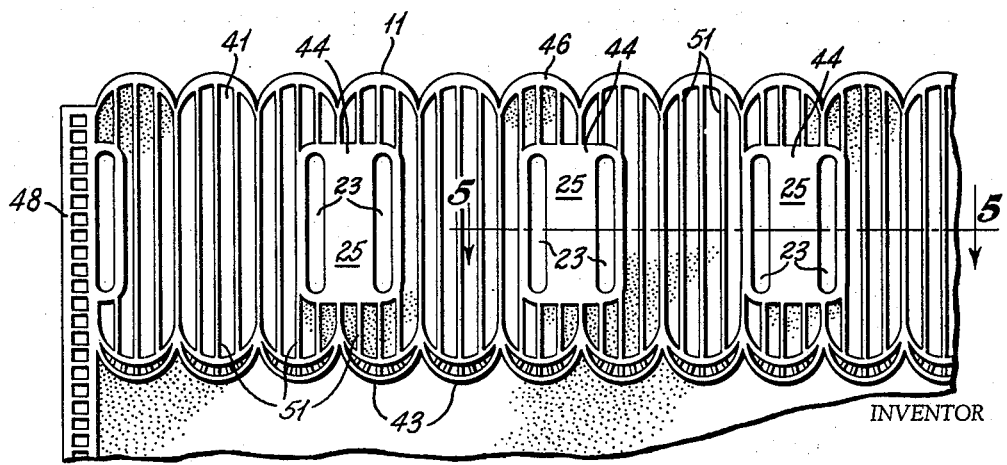
FIGURE 4 is a fragmentary view of the plastic sheet forming the valance of the curtain construction illustrating the structural details of this sheet around the holes for receiving the curtain rod.

FIGURES 4 and 5 illustrate the structural details of that portion of the sheet 11 forming the valance surrounding the holes 23 from which the sheet 11 is hung. The holes 23 are formed in a strip 41 running across the top of the sheet 11. The strip 41 is defined at the bottom by scalloped decoration 43 on the sheet 11 and the scalloped upper edge of the sheet 11. The decoration 43 is formed by solid plastic portions raised above the reticulate background of the sheet 11. The decoration is raised only on the front face of the sheet 11, as the back face of the sheet 11 is flat. A raised portion 44 of solid plastic on the front face of the sheet 11 surrounds each of the holes 23 and covers the strips 25 separating the holes 23 of each pair. Vertical ribs 51 comprising solid plastic raised above the background on the front face of the sheet 11 extend across the strip 41. The background portion of the sheet 11 between the ribs 51 contains the closely spaced tiny apertures as illustrated in FIGURES 8 and 9. The upper scalloped edge of the sheet 11 has a border 46 of solid plastic material raised above the reticulate background of the sheet 11 on the front face thereof. The sides of the sheet 11 are edged with solid plastic borders 48 raised above the reticulate background on the front face of the sheet 11. The borders 48 define large rectangular holes vertically spaced along the edges. The sheet 11 also contains solid portions of plastic raised on the front face thereof above the reticulate background on the hanging portion below the strip 41 to provide decoration thereto. All of the raised portions on the sheet 11 are formed on the front face thereof. The back face of the sheet 11 is flat.

The detailed structure of that portion of the sheet 13 around the holes 27 from which the sheet 13 hangs is illustrated in FIGURES 6 and 7. As shown in FIGURES 6 and 7, the holes 27 are located in a strip 61 running across the top of the sheet 13. The strip 61 is defined by the upper edge of the sheet 13 and by a scalloped decoration 63, which is formed of solid plastic raised on the front face of the sheet 13 above the reticulate background thereof. The top edge of the sheet 13 is covered with a strip 65 of solid plastic material raised above the reticulate background on the front side of the sheet 13. Raised vertical solid plastic ribs formed on the front side of the sheet 13 run across the strip 61 in those portions 31 of the strip 61 between the pairs of holes 27. Each of the holes 27 is surrounded by a strip of solid plastic material 69 which is also raised above the reticulate background on the front face of the sheet 13. Horizontal ribs 71 of raised plastic material extend across the portions 29 between the holes 27 of each pair at the tops and bottoms thereof. The vertical ribs 66 provide reinforcing where the strip 61 is folded to provide the desired fabric construction. The raised solid plastic borders 69 provide reinforcing around the holes through which the curtain rod extends. In the portion of the sheet 13, hanging beneath the strip 61, decorative patterns are formed by solid portions of plastic raised above the reticulate background on the front side of the sheet 13. All of the raised portions on the sheet 13 are formed on the front side thereof, the back side of the sheet 13 being flat. The sheet 15 is identical to the sheet 13.

Thus there is provided a curtain construction which combines the practicality and washability of plastic with the beauty and breathability of the finest Swiss eyelet organdy and their fresh new look will be retained indefinitely with a minimum amount of care.

Many modifications may be made to the above described specific embodiment of the invention without departing from the sphere and scope of the invention, which is defined in the appended claims.

What is claimed is:

1. A plastic curtain comprising a flexible plastic sheet having a reticulate background, said reticulate background comprising a multiplicity of apertures therethrough arranged in columns and rows, the plastic material between said columns and rows being formed in rounded ridges on one face of said sheet, said plastic curtain having a plurality of holes defined therethrough spaced across the top to receive a curtain rod, each of said holes having a solid plastic border raised above the reticulate background of said sheet on one face thereof, said sheet having vertical solid plastic ribs raised above the reticulate background of said sheet in the area of said holes.

2. A plastic curtain comprising a flexible plastic sheet having a plurality of solid plastic portions raised above a reticulate background, said reticulate background comprising a multiplicity of apertures defined therethrough, said plastic curtain having a plurality of holes defined therethrough spaced across the top thereof to receive a curtain rod, each of said holes having a solid plastic border raised above the reticulate background of said sheet on one face thereof, said sheet having vertical solid plastic ribs raised above the reticulate background of said sheet in the area of said holes.

3. A plastic curtain comprising a flexible plastic sheet having a plurality of solid plastic portions raised above a reticulate background, said reticulate background comprising a multiplicity of apertures defined therethrough less than one millimeter in diameter and spaced apart by distances approximately equal to the diameter of said apertures, said plastic curtain having a plurality of holes defined therethrough spaced across the top thereof a receive a curtain rod, each of said holes having a solid plastic border raised above the reticulate background of said sheet on one face thereof, said sheet having vertical solid plastic ribs raised above the reticulate background of said sheet in the area of said holes.

References Cited in the file of this patent

UNITED STATES PATENTS

| | | |
|---|---|---|
| 2,032,935 | Hurt | Mar. 3, 1936 |
| 2,083,991 | Geller | June 15, 1937 |
| 2,092,756 | Grabec | Sept. 14, 1937 |
| 2,123,413 | Geller | July 12, 1938 |
| 2,392,598 | Lewis | Jan. 8, 1946 |
| 2,457,343 | Braunschweiger | Dec. 28, 1948 |
| 2,855,040 | Gaines | Oct. 7, 1958 |
| 2,884,053 | Truesdale | Apr. 28, 1959 |